April 26, 1927.
E. H. FAIRBANKS
LUBRICATING SYSTEM
Filed Jan. 31, 1927
1,626,456
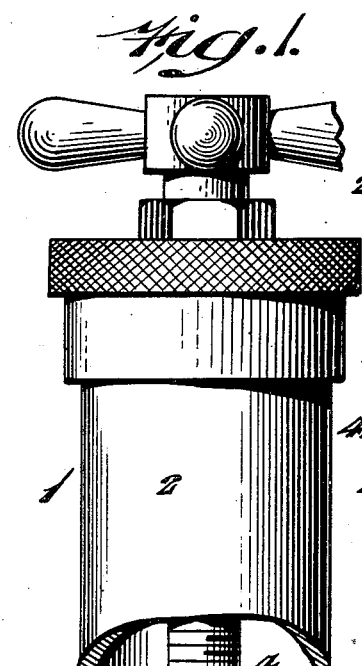
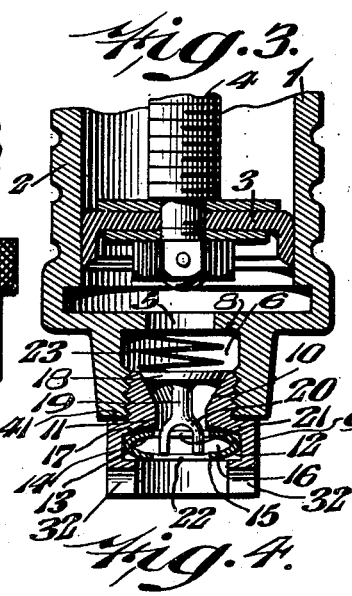
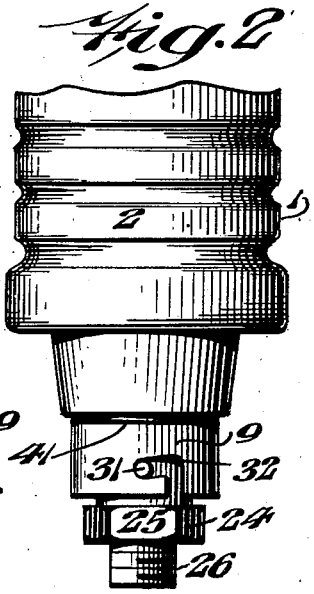
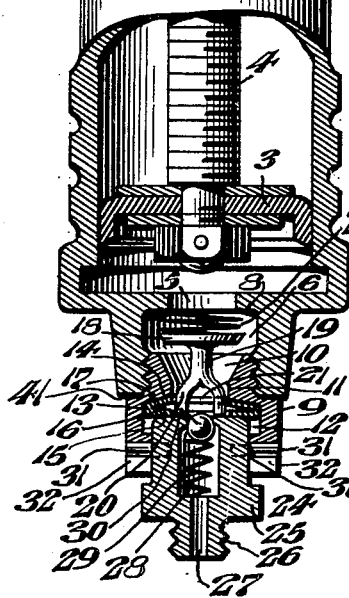
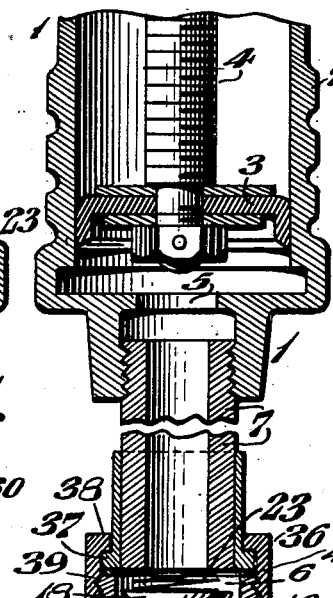
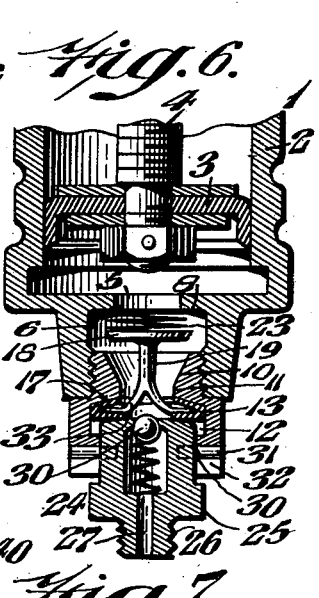
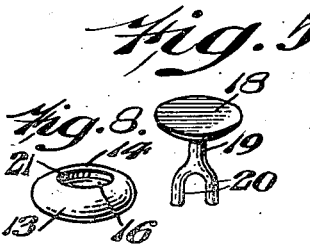
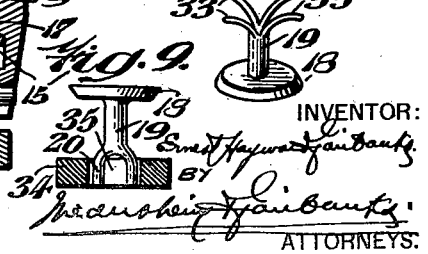
INVENTOR:
Ernest Hayward Fairbanks
ATTORNEYS.

Patented Apr. 26, 1927.

1,626,456

UNITED STATES PATENT OFFICE.

ERNEST HAYWARD FAIRBANKS, OF MERCHANTVILLE, NEW JERSEY.

LUBRICATING SYSTEM.

Application filed January 31, 1927. Serial No. 164,994.

My invention, generally stated, relates to a novel construction of a lubricating system or apparatus of the type wherein the bearing to be lubricated is provided with a coupling member, pin fitting or its equivalent which is adapted to be quickly and detachably connected with a coacting coupling member on the end of a grease gun or the hose thereof, whereby the lubricant may be forced into the bearing under high pressure.

My invention consists more particularly in a novel construction of check valve in the upper coupling member adapted to be seated downwardly by the pressure of the grease within the gun and to be automatically unseated when the upper coupling is connected to the pin fitting or its equivalent, in conjunction with a novel sealing member for effecting a seal, between the upper end of the pin fitting and the valve controlled grease exit, whereby the pressure within the upper coupling will effect the sealing and any increase in pressure will augment the sealing action by reason of the presence of an expansion chamber between the upper and lower walls of the sealing device.

It further consists of a novel construction of an automatically operated check valve positioned in the upper coupling member and adapted to be unseated, when the grease gun is coupled to the pin fitting and adapted to be automatically and instantly seated when the gun is uncoupled from the pin fitting, whereby all extrusion of the grease is prevented, and the top of the pin fitting is left clean when the upper coupling is disconnected therefrom, said check valve having pendant legs which are at all times positioned in a port or ports of the horizontally disposed sealing member, whereby the latter is prevented from displacement at all times.

It further consists of a novel, horizontally disposed sealing member having upper and lower flanges and provided with an internal horizontally disposed expansion chamber, always open to pressure from within, whereby the pressure generated in the act of lubricating will tend to form a tight joint between the pin fitting and the lower wall of the coupling which carries the automatically operated check valve. By my novel construction an effective sealing means is provided which can consist of only two elements, as the check valve and horizontally disposed sealing member, so that the multiplicity of parts heretofore employed in these devices is dispensed with and reduced to a minimum since they comprise merely the downwardly seating check valve having its pendant legs positioned in the ports of the upper and lower flanges, constituting said sealing member, which members can be readily assembled and replaced by an ordinary mechanic and without the employment of skilled labor.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Fig. 1, represents a vertical sectional view of a novel lubricating system embodying my invention, certain parts being shown in elevation.

Fig. 2, represents a side elevation of the lower portion of Fig. 1 showing the bayonet joint connection employed.

Fig. 3, represents a sectional view similar to the lower portion of Fig. 1 but showing the gun and its coupling disconnected from the pin fitting.

Fig. 4, represents a vertical sectional view of my novel lubricating system, showing a flexible hose and a swivel connection therefor employed.

Fig. 5, represents a perspective view of the automatic check valve or upper sealing disk employed in detached position.

Fig. 6, represents a vertical sectional view of a modified construction, showing the automatic valve provided with lower feet or leg members engaging the walls of the expansion chamber of the sealing disk.

Fig. 7, represents a perspective view of the automatic valve seen in Fig. 6 inverted.

Fig. 8, represents a perspective view of the sealing disk in detached position.

Fig. 9, represents a side elevation of the automatic valve collocated with a different form of sealing disk.

Referring to the drawings, in which like reference numerals indicate like parts, 1 designates my novel lubricator, the same comprising the grease gun or pump having the barrel or cylinder 2, the piston 3 and the threaded piston rod 4, the grease being forced past the outlet 5 either directly into the valve chamber 6, as seen in Figs. 1, 3, and 6, or into the flexible hose connection 7, seen in Fig. 4, and thence into the valve chamber 6. The valve chamber 6 is formed between the wall 8 and the upper portion of the coupling 9, which has the conical valve seat 10 therein, from which extends the throat or exit passage 11 for the grease, below which throat is the widened horizontally disposed sealing ring chamber 12, containing the horizontally disposed U or V shaped sealing ring 13, composed of the upper and lower flanges or members 14 and 15, joined at their outer peripheries, whereby there is formed an internal expansion chamber 16, which is always more or less open for the admission of pressure, tending to expand the walls 14 and 15, so as to form a tight joint for preventing the extrusion of grease during the lubricating operation. The upper wall 14 is normally substantially in contact with the upper wall 17 of the coupling 9, while the lower wall or flange member 15 of said sealing member is adapted to be engaged, moved upwardly and slightly compressed by the top of the pin fitting, when the coacting parts are interlocked as seen in Figs. 1, 2, and 6. 18 designates the automatic downwardly seating valve, which is positioned in the valve chamber 6 and provided with the pendant stem 19 terminating in the bifurcations or feet 20, said feet or bifurcations 20 being of such length that they are at all times disposed transversely of the expansion chamber 16 or in other words, they pass through or are positioned in the upper port 21 contained in the upper flange 14 of the sealing member, the port 22 in the lower flange 15 of said sealing member being in vertical alignment with said upper port 21. The feet 20 are spaced apart sufficiently to straddle the ball or check valve 30, so that their terminals contact with the top of the pin fitting to unseat the valve 18, when the parts are assembled as seen in Figs. 1 and 4. 23 designates a coil or other spring which may be employed, if desired, to effect the quick seating of the valve 18, said spring being positioned between the top of the valve 18 and the wall 8. In practice, the spring 23 can be omitted, if desired, since the pressure within the grease gun is sufficient automatically to seat the valve 18, when the parts are disconnected or in the position seen in Fig. 3. It will be apparent however that when the spring 23 is employed that its tension is communicated through the valve and its pendant stem to the top of the pin fitting, so that there is a tendency at all times to keep the pins 31 of the bayonet joint in the requisite frictional contact with the walls of the slots 32, when these parts are interlocked in the act of lubricating, it being apparent however that said spring 23 is entirely disconnected from and has no action whatever on the sealing disc in the construction shown in Figs. 1, 2, 3 and 4.

The pin fitting 24 is of any conventional type and comprises the body portion 25, the pendant threaded stem 26 through which is the passage 27 leading to the point to be lubricated, which passage at its upper end communicates with the chamber 28 and in which is seated the spring 29, which operates to seat upwardly the check valve 30. The pin fitting is provided with one or two pins 31, diametrically disposed and adapted to engage the angular bayonet slot 32 seen in Fig. 2 of the coupling member 9 whereby a species of bayonet joint is formed.

The operation is as follows:

Upon the coupling 9 being disconnected from the gun, the automatic valve 18 can be readily dropped in place upon its seat and the spring 23 can be positioned upon it if it is desired to use the same. The U-shaped sealing member 13 is then slightly deflected and pushed upwardly and inserted in its chamber 12, whereupon the feet 20 of the pendant valve stem will occupy the central portion of the expansion chamber 16 and prevent the sealing member from dislodgement from its chamber 12, the parts now appearing as seen in Fig. 3. When it is desired to lubricate a bearing the coupling slots 32 are interlocked with the pins 31, so that the parts now appear as seen in Figs. 1 and 2, during which operation the contact of the top of the pin fitting with the feet 20 of the valve 18 instantly raises and unseats said valve and the top of the pin fitting moves upwardly or compresses the lower flange 15 of the sealing member 13, so that the parts now appear as seen in the lower portion of Figs. 1 or 4. It will be apparent that the expansion chamber 16 is slightly open to pressure from within, as will appear from said figures and upon the rotation of the threaded piston rod 4, a high pressure will be imparted to the grease in advance of the piston 3, which will flow through the port 5 past the periphery of the valve 18, past the feet 20 thereof, through the throat 11, and through the upper and lower ports 21 and 22 of the sealing member, past the check valve 30, and through the passages 28 and 27 to the desired point to be lubricated.

By reason of the presence of the U or V shaped sealing member 13 having the expansion chamber 16 always open to pressure, as seen in Fig. 1, it will be apparent that considerable pressure will be exerted within said expansion chamber 16 and the greater the pressure the tighter will be the joint or the sealing action between the flanges 14 and 15 and the contiguous surfaces as seen in Figs. 1 and 4. Upon disconnecting the gun coupling 9 from the pin fitting, the valve 18 will instantly seat and assume the position seen in Fig. 3, irrespective of whether the spring 23 is employed or not and the sealing member 13 will tend to assume substantially the position seen in Fig. 3. The instantaneous seating of the check valve 18 will prevent any extrusion of grease and in practice there will be no grease left on the top of the pin fitting when the parts are disconnected. It will be seen from the foregoing that by my novel construction a very simple and efficient device is produced in which only two elements are necessary to effect the result desired, said elements being the valve 18 and the sealing member 13 which are obviously very cheap to manufacture and install and each of which can be readily positioned in place without the employment of skilled labor. The sealing member 13 can be made of leather or any other suitable material and good results can be obtained if a thick, horizontally disposed leather washer 34 is employed in the sealing chamber 12 having a central port 35 in which the pendant legs 20 of the valve may be positioned. In the construction shown in Fig. 9, I have shown the same character of sealing member 13 employed, but I have shown the terminals 33 of the stem 19 of the valve 18 as being four in number, which are adapted to be positioned in the expansion chamber 16, as seen in Fig. 6, so that the sealing member 13 and the valve 18 will tend to move as a unit.

When the flexible hose 7 seen in Fig. 4 is employed, which is desirable for reaching inaccessible bearings, a suitable form of swivelling device 36 may be employed as seen in Fig. 4, said hose having an annular shoulder 37 secured thereto, which is engaged by the inturned flange 38, of the coupling nut 39, which is in threaded engagement with the coupling member 9. A gasket or packing ring 40 may be employed if desired, and suitable packing can be employed at the points 41 if desired.

In the conventional type of pin fittings commonly employed, there are occasionally slight differences in the distance between the pins and the top of the pin fitting, which variations of dimensions are accommodated or provided for by my novel sealing member having the compressible upper and lower flanges with the expansion chamber 16 therebetween. This expansion chamber, therefore, serves a dual function, since it is always open from within to admit pressure during the lubricating operation to distend the upper and lower inwardly diverging flanges 14 and 15 against the contiguous juxtaposed metal faces, and in addition it affords means for accommodating and effectively sealing the top surfaces of various sized pin fittings, or pin fittings, where there is a slight difference in the distance from the pins to the top of the fitting.

It will be found in practice that after the lubricating operation is completed that the instant the upper coupling 9 is disconnected from the pin fitting, the upwardly seating check valve of the latter will instantly close, and the automatic valve 18 will also instantly close, and owing to the wiping action of the feet 20 and member 13 on the top of the pin fitting there will be no extrusion of grease from the coupling member 9, and also no grease will be left on the top of the pin fitting. It will be apparent that I not only dispense with the element of a spring bearing on the sealing disc to push the latter forwardly, but in addition there is no vacuum formed within the coupling member 9 at any stage of the lubricating operation, or during the disconnection of the coupling from the pin fitting. It will thus be seen from the foregoing that I have provided means for conveying a lubricant under pressure to the desired point to be lubricated which not only prevents the extrusion of lubricant even though the latter may be forced between the bearing surfaces under a very high pressure, but also prevents the lubricant from remaining upon or being extruded from the exposed or terminal portions of the coupling members after the latter have been uncoupled. Special attention is called to the fact that the automatic check valve 18 when its coupling is disconnected from the pin fitting forms a complete seat and prevents any lubricant from passing past the valve after the parts are uncoupled, which is a great improvement over prior devices wherein a cup washer having a central constantly open port is employed.

While I have shown my invention as being applicable to a small, manually held grease gun or pump, it will be understood that the same is equally well adapted to large grease containers or compressors which are mounted upon wheels, or on a truck and adapted to be trundled about the floor of a garage, in which latter case the flexible hose 7 is ordinarily employed.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is:

1. In a lubricating system, the combination of means for supplying lubricant under pressure having a discharge outlet, a coupling connected with said discharge outlet, a valve seat in said coupling, having a throat leading therefrom, an automatic downwardly seating valve also in said coupling, a horizontally disposed sealing chamber wider than said throat and positioned below said valve, a horizontally disposed sealing member in said chamber having a central port therethrough, and an expansion chamber closed at its outer periphery and open to pressure from said lubricant supplying means from within said coupling, and a stem depending from said valve in alignment with the port in said sealing member and having its lower end positioned in said port, and disconnected from said sealing disk, whereby the latter is prevented from dislodgement.

2. In a lubricating system, the combination of means for supplying lubricant under pressure having a discharge outlet, a coupling connected with said discharge outlet, a valve seat in said coupling, having a throat leading therefrom, an automatic downwardly seating valve also in said coupling, a horizontally disposed sealing chamber wider than said throat and positioned below said valve, a horizontally disposed sealing member in said chamber having a central port therethrough, and a stem depending from said valve in alignment with the port in said sealing member and having its lower end positioned in said port, and disconnected from said sealing member, whereby the latter is prevented from dislodgement.

3. The combination with a lubricant supplying means, of a conduit for conducting lubricant to a part to be lubricated, a coupling member secured to the end of said conduit and provided with a spring pressed upwardly seating valve, means for supplying lubricant to said conduit comprising a receptacle provided with a discharge outlet, a second upper coupling member connected with said discharge outlet, means for detachably uniting said coupling members, a horizontally disposed sealing chamber in said upper coupling member, and a horizontally disposed sealing member for sealing the joint between said coupling members and for removing excess lubricant from the adjacent ends thereof when said coupling members are uncoupled, said sealing member having upper and lower inwardly diverging flanges and being located in said chamber and having an internal expansion chamber, said chamber being open at all times to fluid pressure from said lubricant supplying means.

4. The combination of an upper and lower hollow member, means for supplying lubricant to said upper hollow member under pressure, means for detachably connecting said members, and means for sealing said connection comprising a sealing member having upper and lower inwardly diverging flanges positioned between said first mentioned members, there being an expansion chamber open to pressure from said lubricant supplying means between said flanges and the latter being held against the juxtaposed walls of said coupling members by the pressure of the lubricant.

5. The combination with a member for receiving lubricant, of means for supplying lubricant thereto comprising an upper and lower hollow member, means for supplying lubricant to said upper hollow member under pressure, means for detachably connecting said members, and means for sealing said connection, comprising a sealing member having upper and lower inwardly diverging flanges positioned between said members, there being an expansion chamber open to pressure from said lubricant supplying means between said flanges and the latter being held against the juxtaposed walls of said members by the pressure of the lubricant, in combination with a downwardly seating check valve having a pendant stem engaging a central port in said sealing member.

6. The combination of a hollow coupling member having a pin projecting from a side thereof and a spring pressed closure, of a pump, a discharge conduit having one end secured to the pump outlet, a second hollow coupling member for receiving the closed end of said first named coupling member secured to the other end of said conduit and provided with a bayonet slot adapted to co-act with said pin, and a sealing member mounted in an enlarged transverse chamber in the bore of a coupling member, and provided with inwardly diverging upper and lower flanges, forming an expansive chamber open at all times to the pressure from said pump.

7. The combination with a relatively fixed hollow coupling member having an upwardly seating spring-pressed valve, of a pump, a discharge conduit having one end secured to the outlet of said pump, a second upper hollow coupling member for receiving the closed end of said first named fixed coupling member secured to the other end of said conduit, a transversely arranged sealing member mounted in a transverse chamber in the bore of said upper coupling member, and having upper and lower inwardly diverging flanges forming an expansion chamber therebetween always open to fluid pressure from said pump, said upper and lower flanges being pressed against the juxtaposed ends of said coupling members during the lubricating operation, and a downwardly seating valve in said upper coupling member, having a pendant stem, whose terminals straddle said upwardly seating valve when said coupling members are interlocked.

8. In combination with a hollow relatively fixed coupling member having an upwardly seating spring pressed valve, of a pump, a discharge conduit having one end secured to the outlet of said pump, a second upper hollow coupling member secured to the other end of said conduit for receiving the closed end of said first named fixed coupling member, a transversely arranged sealing member mounted in a transverse chamber in the bore of said upper coupling member, and having upper and lower inwardly diverging flanges, forming an expansion chamber open at all times to the pressure from said pump, and a downwardly seating valve in said upper coupling having a pendant stem occupying a central port in said transverse sealing member.

9. The combination of a pump having a discharge outlet, a coupling member connected with said discharge outlet and provided with a bayonet slot, a sealing member transversely mounted in a transverse chamber in the bore of said coupling member, and having inwardly diverging walls, forming an expansion chamber open at all times to the pressure from said pump, a downwardly seating check valve in said coupling member, and a stem depending from said valve and provided with feet positioned in said expansion chamber.

10. The combination of a grease cup, comprising a tubular member having one end flanged inwardly to form a valve seat, an upwardly seating valve for the latter, a pin projecting from said tubular member, a spring below said valve for holding said valve on its seat, a grease pump having a discharge conduit, an upper coupling on the latter coacting with said pin for detachably connecting the discharge end of said conduit with said grease pump, a downwardly seating check valve in said coupling, a transversely arranged sealing member in said coupling below said valve, said member having upper and lower inwardly diverging expansible flanges, forming an expansion chamber therebetween always open to fluid pressure, and a stem depending from said valve having forked terminals straddling said upwardly seating valve, and positioned in a central port in said sealing member, the length of said stem being such that when the members are coupled, the contact of the top of said grease cup with said forked terminals will unseat said check valve.

11. The combination of a pressure creating means, a member connected thereto and having a chamber therein and a transversely arranged annular sealing member in said chamber, said member being closed at its peripheral portion and having upper and lower inwardly diverging flanges forming an expansion chamber therebetween open at all times to pressure from said pressure creating means.

12. The combination of a pressure creating means, a pin fitting, a member intermediate thereof and adapted to be connected thereto and having a transverse chamber therein, and a sealing member in said chamber closed at its peripheral portion and having a central port therethrough, and upper and lower inwardly diverging flanges forming an expansion chamber therebetween always open to pressure from said pressure creating means, the upper of said flanges contacting with a wall in said intermediate member and the lower of said flanges contacting with and being compressed by the top of said pin fitting.

13. The combination of a pressure creating means, a pin fitting, a member intermediate thereof and adapted to be connected thereto and having a transverse chamber therein, a sealing member in said chamber closed at its peripheral portion and having a port therethrough, and upper and lower inwardly diverging flanges forming an expansion chamber therebetween always open to pressure from said pressure creating means, the upper of said flanges contacting with a wall in said intermediate member and the lower of said flanges contacting with and being compressed by the top of said pin fitting, and a downwardly seating check valve having a pendent stem passing through said sealing member, a lower end of said stem being adapted to contact with the top of said pin fitting and to be raised thereby to unseat said valve when said pin fitting and intermediate member are connected.

14. The combination of a pressure creating means, a member connected thereto and having a chamber therein and a transversely arranged sealing member in said chamber having a central port therethrough, a check valve positioned above said sealing member, and a spring exerting downward tension at all times on said check valve, the latter having a pendant stem adapted to contact with the top of a pin fitting.

15. The combination of a pressure creating means, a member connected thereto and having a chamber therein and a transversely arranged sealing member in said chamber, said member having a central port therethrough, a pin fitting, a bayonet joint connection common to said pin fitting and member, a downwardly seating check valve above said sealing member, and a spring exerting downward tension on said check valve, the latter having a pendant stem passing through said sealing member out of connection therewith and adapted to contact with the top of said pin fitting, said spring causing members of the said bayonet joint connection to be held in frictional engagement when interlocked.

ERNEST HAYWARD FAIRBANKS.